United States Patent Office 3,053,554
Patented Sept. 11, 1962

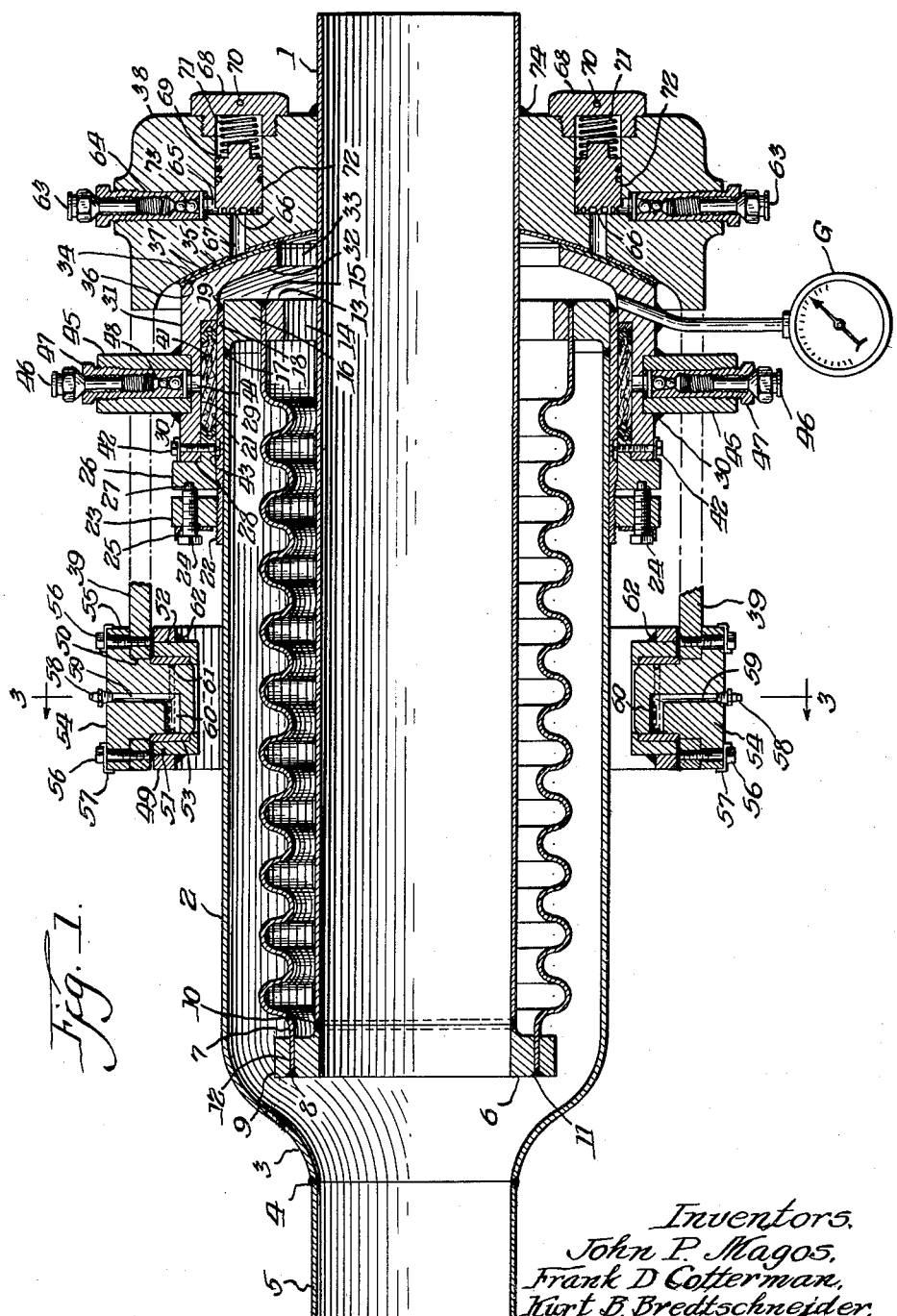

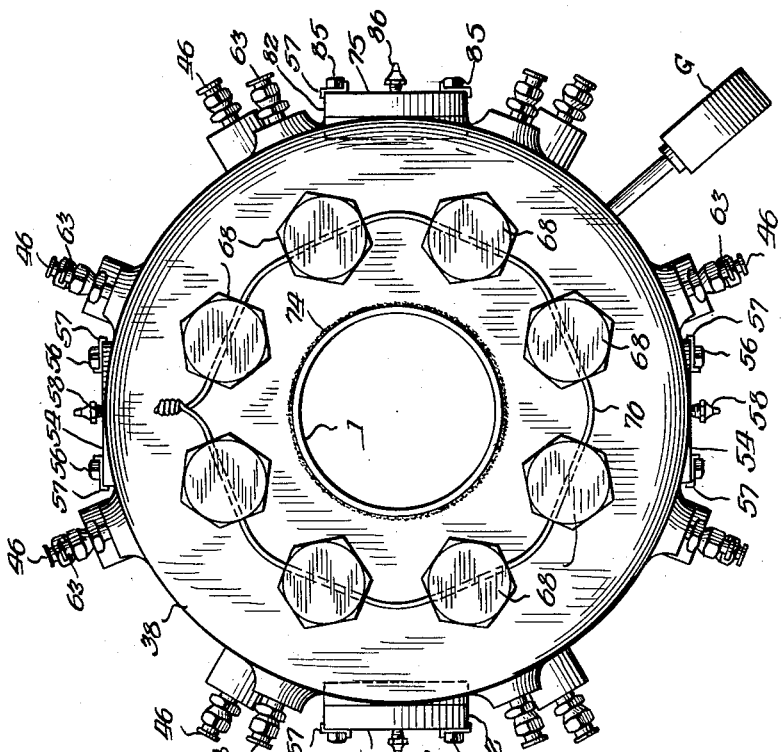
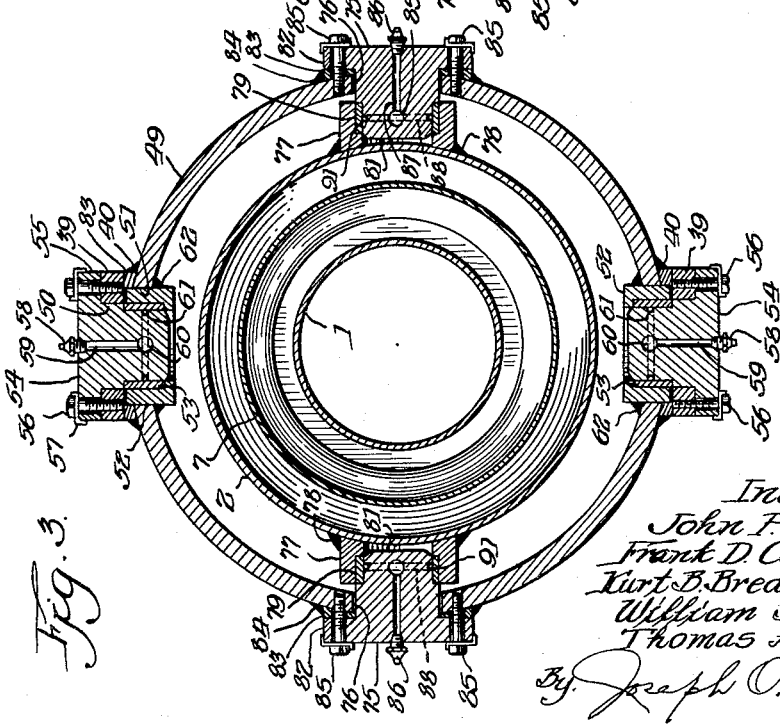

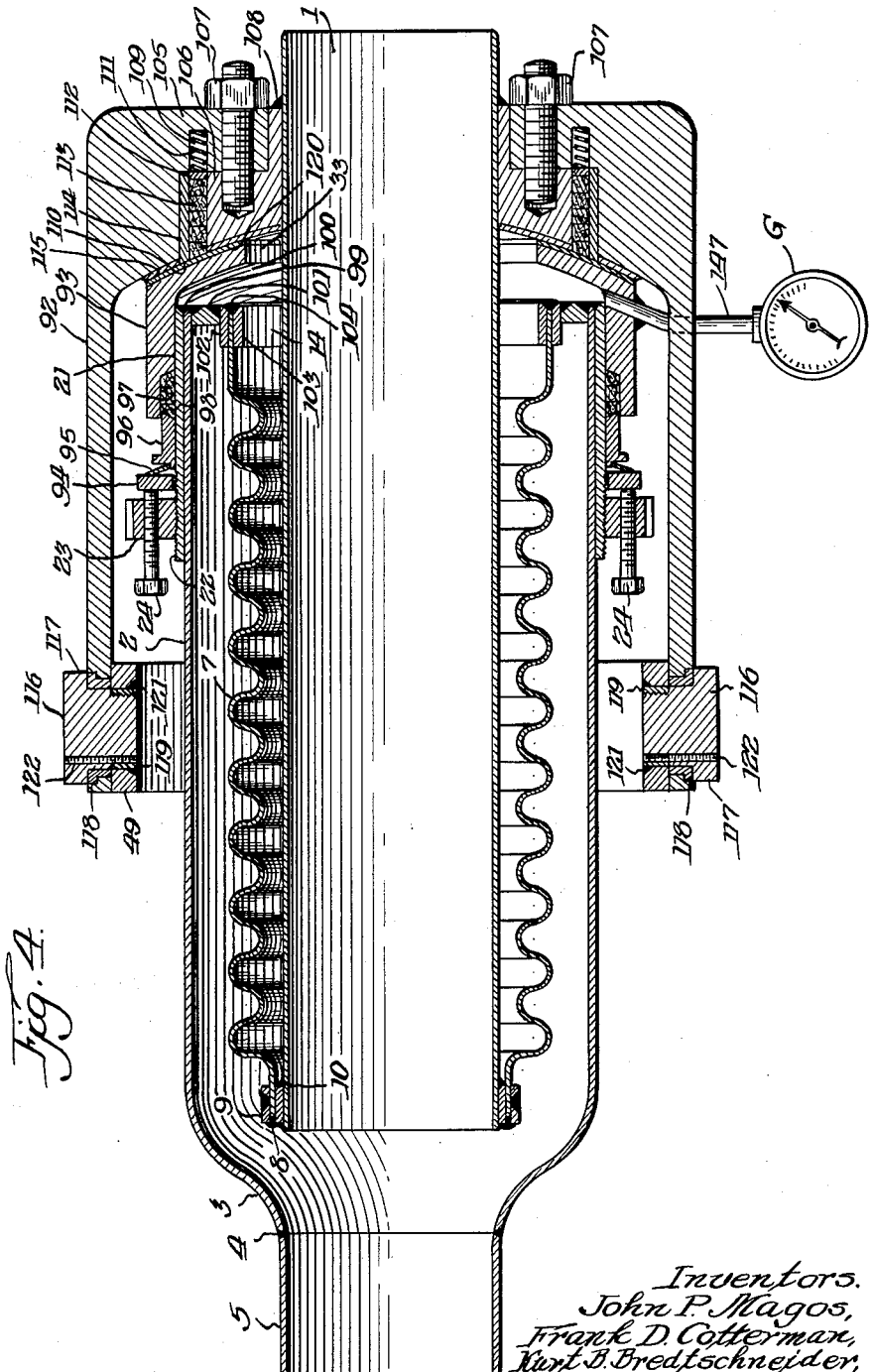

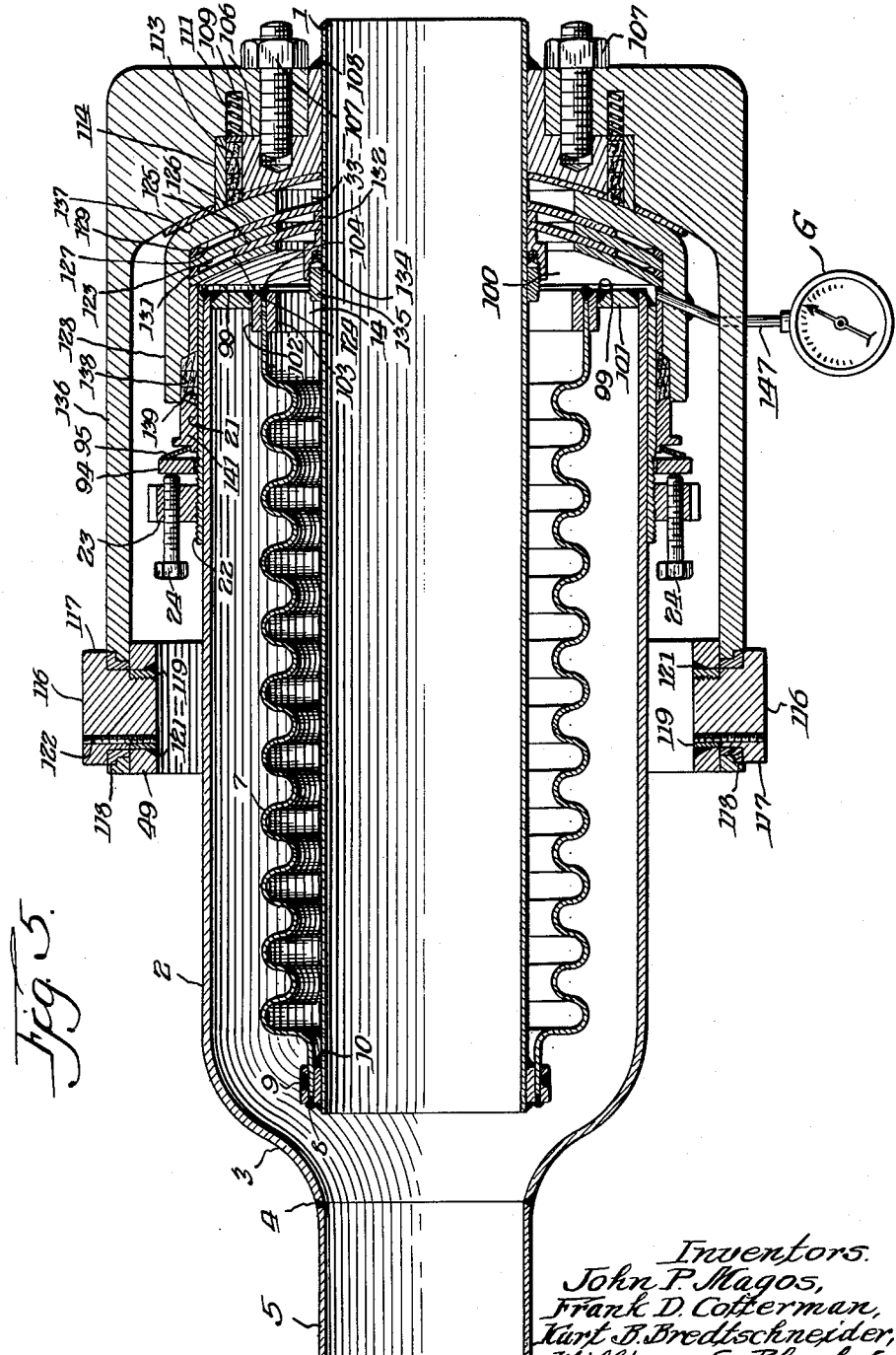

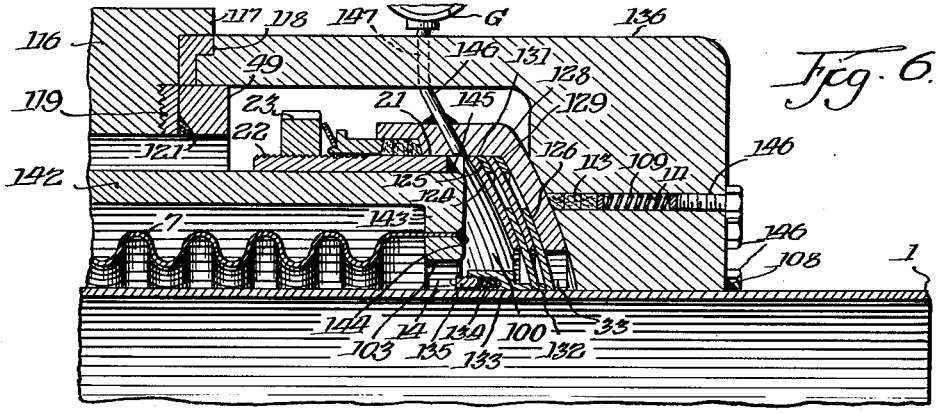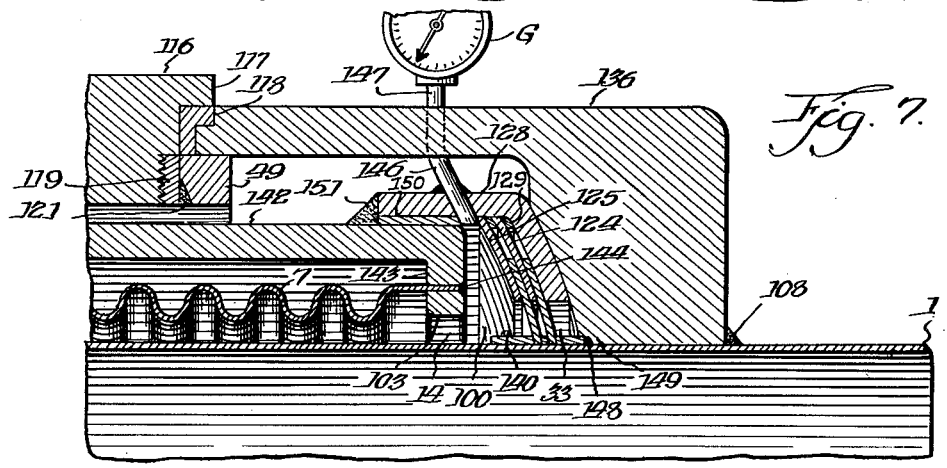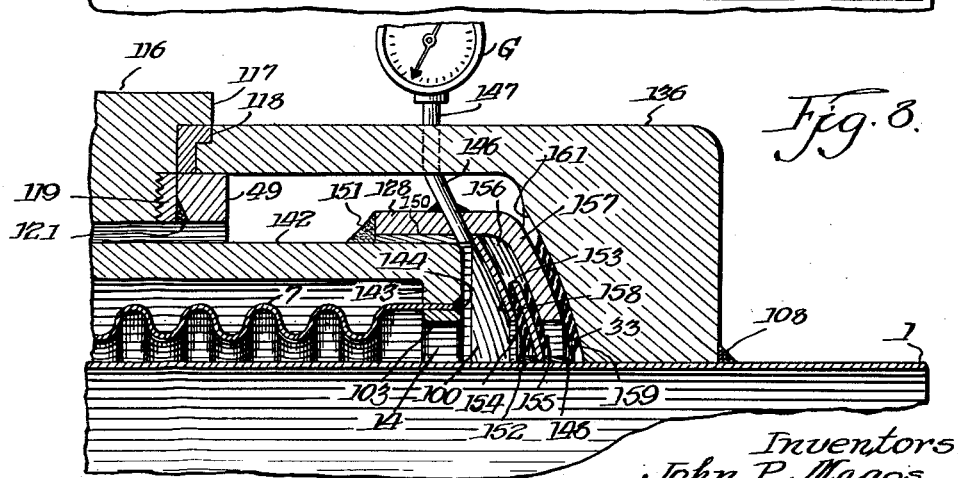

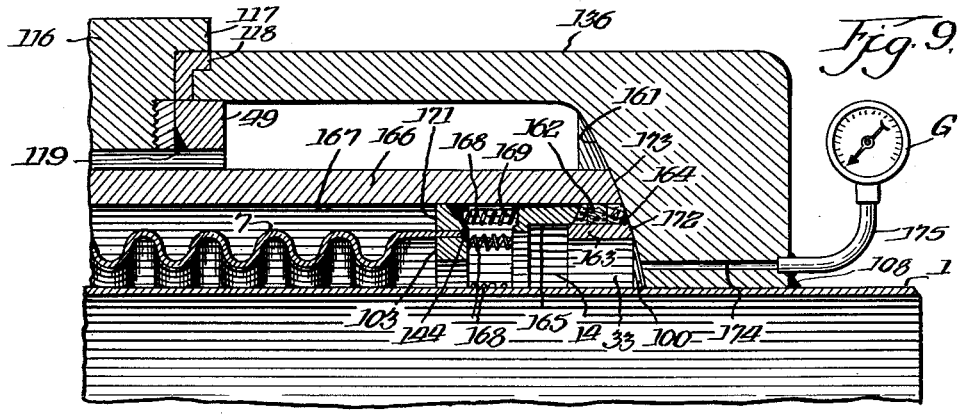
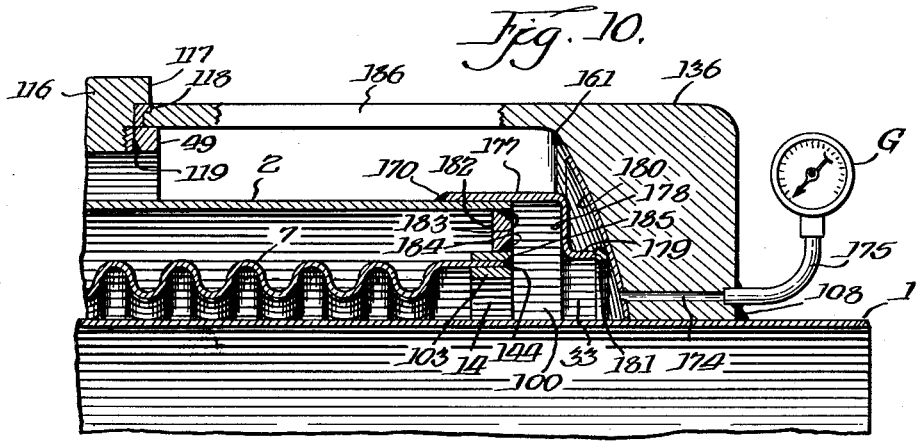
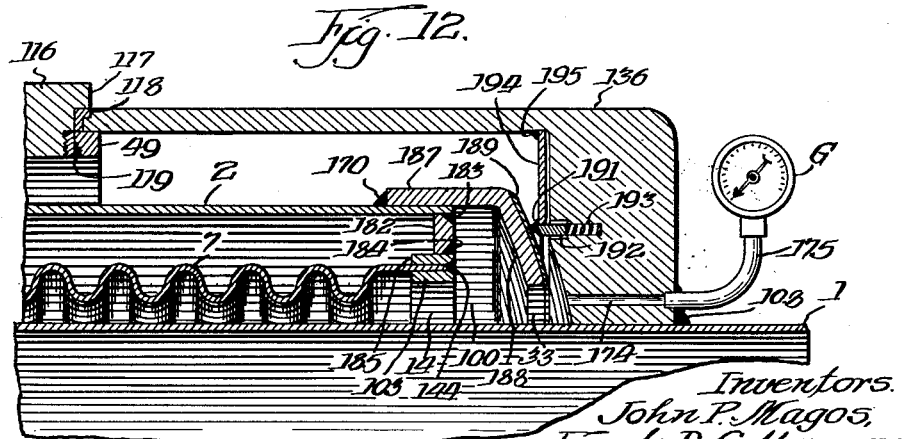

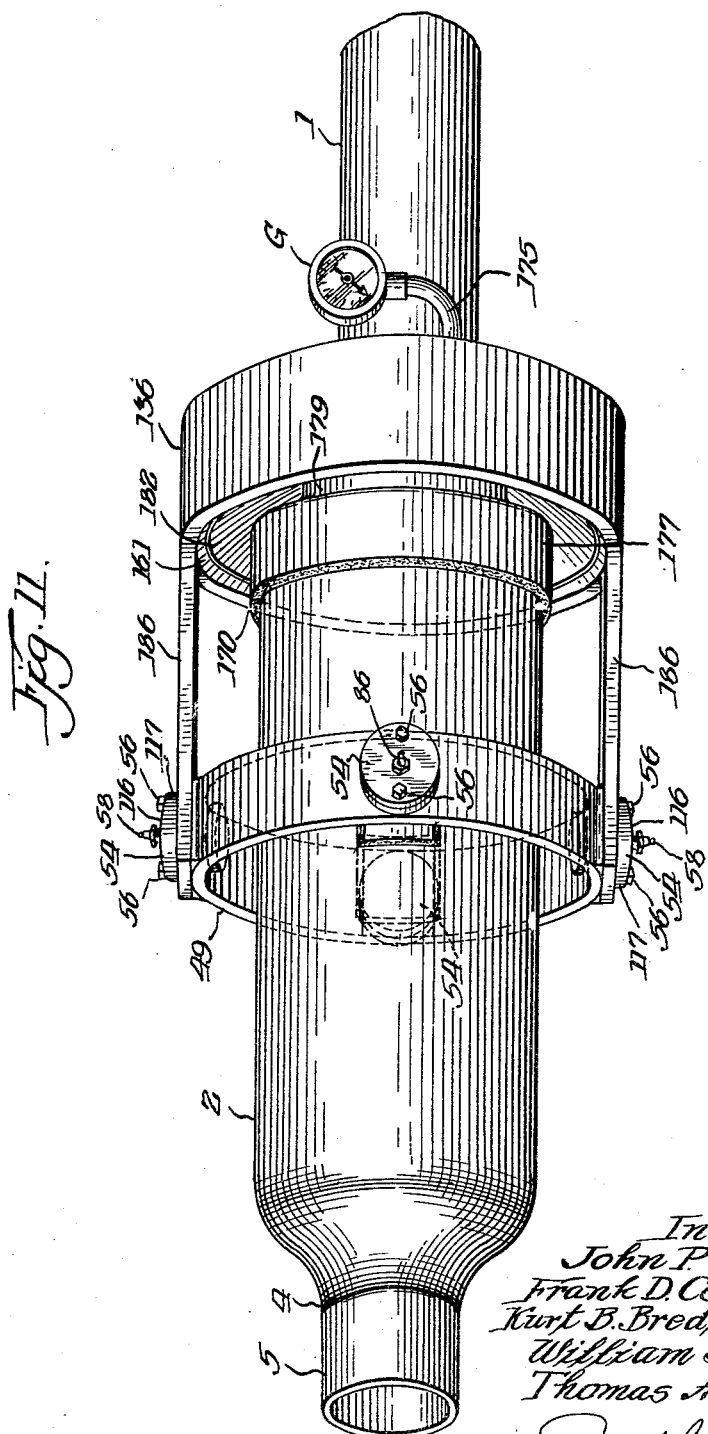

3,053,554
FLEXIBLE PIPE ELEMENTS
John P. Magos, Wilmette, Kurt B. Bredtschneider, Chicago, Frank D. Cotterman, La Grange, William S. Black, Evergreen Park, and Thomas A. Rodda, Villa Park, Ill., assignors to Crane Co., Chicago, Ill., a corporation of Illinois
Filed Oct. 26, 1960, Ser. No. 65,217
20 Claims. (Cl. 285—114)

This invention relates generally to flexible pipe elements, and, more particularly, is concerned with what is known by those skilled in the art as an improvement in the secondary sealing means for such flexible pipe units. It constitutes an advancement or betterment in the type of primary sealing element shown in patent application Serial No. 792,830, filed February 12, 1959, by one of the co-inventors of the instant invention.

As pointed out in the said earlier filed patent application, this particular kind of flexible pipe element is especially useful for those pipeline services involving severe pressure and temperature conditions. Its beneficial use lies in its providing relatively large lateral flexibility or movement in a fluid-conveying piping system in response to unusually high pressures or temperatures, or both, and particularly in handling the stresses arising in the system as substantial changes in either temperature or pressure are encountered.

Further, vibratory or shock movements of resiliently mounted equipment connected by the said piping are frequently encountered.

The current invention has for its principal object the provision of a novel and improved secondary seal means to prevent or minimize the losses in steam or other relatively costly fluids from the flexible pipe unit after the primary seal normally provided has failed, say due to unusually severe service, accident, or even after extended normal wear has occurred.

Another object is to provide for a secondary seal means for use with a primary flexible unit of the character hereinabove referred to, in which the seal means is generally useful in high temperature steam piping and the like, and where extreme flexibility is required in order to handle successfully the turbine with respect to the boiler. In the latter connection, it should be understood that expansion and contraction stresses exist in the line and pipe connections of the system, and specifically, the apparatus of this invention is useful in handling the problems arising from motion of the turbine with respect to the boiler under cramped conditions such as aboard ship.

Subsequently, it will also be appreciated that the construction of this invention lends itself to installations in such cases where compactness of the piping is desirable or necessary, while at the same time providing a species of fluid seal that is highly effective in its performance under severe pressures and temperatures, as, for example, aboard ship in relatively cramped quarters and under sea-going conditions in which shock and impact are not all uncommon.

It will also become apparent that the several constructions illustrative of this invention can be conveniently and economically applied in many applications in commercial processes high pressure and high temperature piping.

A further object of the invention is to provide for a fluid sealing construction in which a flexible pipe element of the type hereinabove referred to, such as corrugated pipe or bellows, can conveniently be provided with a failsafe feature, so that if the said pipe or bellows should fail, the fluid, such as hot steam or other dangerous fluids escaping, will not leak into the room or chamber in which the piping employing the corrugated pipe element is installed.

Another object is to provide for a fluid retaining construction in which selected elements constituting a part of the sealing means employed will be in slidable contact with certain of the piping members forming the flexible assembly. Thus, in the event of the failure of the primary seal provided by the corrugated pipe or bellows, the resulting fluid leakage of the escaping fluids will be largely prevented by the building up or accumulation of line fluid pressure within the chamber outside of the bellows or pipe, whereby to force the sealing elements such as packing for example into tighter sealing contact.

A further object is to provide for a secondary seal construction in which a preselected sealing means used, such as the labyrinth type, for example, will provide a tortuous passage and thus allow for substantial pressure drop through the assembly for effecting a substantial reduction of line fluid leakage from the piping system.

A still further object of this invention is to provide for a construction which is relatively simple to construct, assemble and to install, and yet which is easily accessible in the event of repair or replacement becoming necessary.

A further object is to provide for a sealing means which may also be used in many cases as the primary sealing means in addition to being employed as the secondary sealing element.

Another object is to provide for a secondary seal construction in which visual indicating means may be conveniently applied in cooperation with the sealing elements whereby to permit ready perception or observation on the part of the operator in taking cognizance of failure occurring in the primary seal at its inception or at a relatively early stage of such failure, thus to facilitate remedial measures being taken promptly and avoiding costly losses.

Another object of this invention is to provide for a sealing assembly which restrains longitudinal movement and provides a fixed radius around which the corrugated pipe or bellows is swivelably joined and limited movable.

Other objects and advantages will become more readily apparent upon proceeding with the following description read in light of the accompanying drawings, in which:

FIG. 1 is a sectional assembly view of a secondary seal element embodying a preferred form of our invention;

FIG. 2 is an end exterior view of the construction referred to in FIG. 1;

FIG. 3 is a fragmentary sectional assembly view taken on the line 3—3 of FIG. 1;

FIGS. 4 to 10 inclusive and 12 are fragmentary sectional assembly views of several modified forms of secondary sealing means capable of being employed;

FIG. 11 is an exterior perspective view of the construction shown in partial sectional assembly in FIG. 10.

Similar reference numerals refer to similar parts throughout the several views.

Referring now to FIG. 1, it should be noted that the assembly constituting the pipe joint consists essentially of an inner pipe 1 and an outer or larger pipe or casing 2, the latter pipe at one end portion thereof being reduced in diameter as at 3 to provide for a suitable attachment, such as at 4, to a length of pipe 5, the latter member being preferably, although not necessarily, of the same diameter as the inner pipe 1. While it has been indicated that an annular weld, for example, may be employed at 4, it will, of course, be obvious that if desired the outer pipe 2 may be suitably reduced integrally or swaged down to the desired size without the necessity for providing a separate connection as at 4 applied to the reduced end portion 3.

The inner pipe 1, as shown more clearly in the lefthand end portion of FIG. 1, is provided with an inner ring flange 6, around which the elongated corrugated pipe or bellows 7 is snugly fitted and welded as at 8.

It is preferably held in such position by means of a surrounding or outer ring flange 9, the latter member being chamfered annularly as at 11 to receive the cylindrical end portion 12 of the corrugated pipe 7. As illustrated, the said corrugated pipe extends for a substantial portion of its length over the outer periphery of the inner pipe 1. Preferably, the inner flange 6 is attached as by means of the annular weld 10 to the inner pipe 1, as shown. At its opposite end, the corrugated pipe 7 is snugly mounted over the supporting ring 13, the latter being centrally apertured and spaced apart from the outer periphery of the inner pipe 1, as shown, to provide an annular space 14 around the latter member. The space 14 serves as a passage for the escaping line fluid in the event that the bellows 7 is no longer pressure tight or if any of the welds by which it is connected to the inner pipe 1 become defective and permit line fluid leakage.

The corrugated pipe is attached in a manner similar to that previously described as at 8 to the support ring by means of the weld 15. Around the outer periphery of the corrugated pipe 7, a ring flange 16 is weld-sealed annularly as at 15 to the inner support ring 13, and laterally inward of an end portion thereof, the outer annular member 16 is welded as at 17 to the end of the pipe 2 as illustrated. Snugly fitted around both of the peripheral portions 18 of the annular member 16 and end welded thereto as at 19 a threaded liner 21 is snugly received thereon. It will be noted that at its outer end portion the liner is threaded as at 22 to receive the threaded gland member 23, the latter member being provided with a plurality of annularly spaced apart gland bolts 24. Each of the latter is provided with a lock washer engaging each bolt as at 25 and bearing against the slidably mounted axially movable gland member 26 as effected by means of the end applied load of the bolts 24, making the gland contact at 27.

The axially movable gland member 26 is formed with a reduced annular end portion 28 receivable within the annular recess 29 provided by the sealing shoe 31 thereby to arrange a packing chamber around the liner 21 as shown. At its opposite end portion, the fluid sealing shoe 31 is inwardly turned or flanged as at 32, such flange extension providing for an outer annular chamber 33 over the inner pipe 1, as illustrated. The chamber 33 is complementary to the aperture 14 to function similarly. The inturned flange portion 32 on its outer periphery, as indicated at surface 34, is of spheroidal configuration to permit of limited universal motion, and is preferably faced as at 35 with a hard facing material for wear-resistant engagement with a similarly formed engaging surface 36 likewise hard-faced as at 37 on the overlying yoke member 38 carrying the oppositely disposed yoke arms 39.

Directing attention now to the annular recess or stuffing box 29, the packing 41 is positioned therewithin; the packing may be a die-formed ring braided asbestos-type or other suitable kind depending upon the service condition encountered. In some cases, a molded plastic or grease-type packing may be used for the static seal at the outer pipe stuffing box. The recess 29 serves as a stuffing box in which after the packing box has been filled to the extent indicated, the transversely extending locking set-screws 42 are placed in position to engage the annularly disposed recesses 43 to limit the movement and prevent the blowing-out of the gland 26 and the packing. It will be noted that the outer wall defining the packing chamber 41 is provided with the annularly spaced-apart openings 44. These openings communicate with the interior of the sealant supply fitting 45 having the adapter 46 for use with a sealant gun (not shown) connected to the threaded bushing 47 and communicating with a lower chamber 48 whereby an additional reservoir of sealant may be conveniently supplied to the stuffing box 29 when necessary. An annular weld 30 or other means of attachment may be used to hold the fitting 45 firmly to the shoe 31. It has been found that such provision effectively controls or minimixes line fluid leakage which might otherwise occur upon unusual excess movement taking place between the liner 21 and the shoe 31.

It should be noted that the dog points of the transversely extending set screws 42 located immediately above the outer pipe stuffing box while limitedly movable within the milled key-way or slot 43 when tightened will limit the axial movement of the stuffing box housing with respect to the outer pipe 2. The said set screw engagement likewise permits predetermined rotative positioning of the shoe relative to the outer pipe 2 and also prevents the stuffing box housing of the sealing shoe 31 from rotating until the sealant injection adapters are properly located relative to the yoke arms 39 as more clearly shown in FIG. 1.

The dog point set screws in the screwed ring shown above the outer pipe stuffing box provides a slight load between the outlet pipe stuffing box housing and the yoke. This prevents an excessive sealant pressure in the stuffing box from repelling the outer pipe stuffing box housing. It has been found that the dog points of the said set screws located in small holes drilled in the second gland flange 26 prevents rotary motion of the screwed ring 21 with respect to the outer pipe 2.

The spaced apart yoke arms 39 at one end portion thereof remote from the shoe are fitted over a gimbal ring 49 having the oppositely spaced apart relieved portions 51 to receive the sleeve 52 and the bushing 53 as shown more clearly in FIG. 3. Also received in snug relation to the sleeve 52 and the bushing 53 is a trunnion 54 mounted within the opening 50 and having the flange connection 55. The latter connection is made by means of the bolts 56 and the lock washer 57 to engage the yoke arm 39. A lubricator fitting 58 is provided having access to the lubricant chambers 59 and 60 and supplies the desired lubricant to the annular channels 61 in providing for the limited swivelling connection of the trunnion 54. An annular weld 40 holds the positioning insert pad 83 in place to receive the yoke arm 39 (FIG. 3). The sleeve is weld-secured as at 62 to the gimbal ring 49 to effect the desired flexibility in the angularity of such swivelling movement between the said gimbal ring and the yoke arms 39 upon being subjected to an expansion (or contraction) stress at such location. It will be appreciated that the gimbal ring connection is a preferred modification of the ball-and-socket or globular joint in which the ball is usually retained in place by a flange slipped over it and screwed to an opposing flange.

At its opposite end, the yoke 38 is provided on an outer portion thereof with a lubricant supply fitting 63 threadedly received within the lubricant chamber bushing 64. The said fitting provides for lubricant or other sealing media to enter the chamber 65 and to flow over the crowned end 66 of the piston 72 to enter the chamber 67 and thereby provide for suitable fluid sealing between the matching convex and concave surfaces 34 and 37 of the shoe and yoke respectively. The threaded cap 68 serves to enclose the piston chamber 69 and by means of the coil spring 71 it holds the reciprocally movable piston 72 under load or in biased relation to the said piston lubricant chamber 67, so that when a lubricant or other fluid sealant is being introduced the spring is compressed between the piston and cap as shown. Thus, it will be clear that the lubricant in the chamber 67 is preferably maintained under pressure, realizing that the ball check valves 73 will serve to prevent escape of the lubricant from the chamber other than by such loss as may occur past the sealing surfaces between the shoe and yoke at surfaces 34 and 37. In further providing the assurance that the chamber 67 is relatively pressure tight, it will be understood that the inner pipe on its outer periphery is connected in fluid tight relation to the yoke 38 by means of the annular weld 74.

It will be appreciated that in order to secure the gimbal ring 49 against endwise movement relative to the outer pipe 2 positive means must be taken to provide for such retention. In this connection, attention is now directed to FIG. 3, in which on a horizontally disposed axis in opposed relation to each other a second universal means is mounted. The latter construction consists of the oppositely disposed trunnions 75 mounted within the side disposed apertures 76 of the ring member 49, the said trunnions projecting inwardly thereby to engage the fixedly mounted bearing 77 weld-secured at 78 annularly to the outside wall of the outer pipe 2. Preferably for wear-resisting purposes, an annular bushing 79 is employed to receive the reduced shank portion 81, as illustrated. At its outer end portion, the trunnion 75 is formed with a flange as at 82 and is shouldered on the insert pad 83, the latter being weld secured as at 84 to the ring 49 as previously stated. For purpose of holding the trunnion firmly against the insert member 83, bolts 85 are applied to threadedly engage the wall portion of the ring 49 as shown. To aid in facilitating the desired universal motion relating to the pivotal and limited rotative engagement of the trunnion in connection with each support of the outer pipe 2, force lubrication is employed as indicated at the adapter 86, the lubricant channels 87, 88, and 89, the said channels communicating with the annular recess 91. Thus, in cooperation with the trunnions 54 disposed above and below the assembly on the vertical axis, the trunnions 75 beneficially aid in providing improved flexibility of the mounting of the outer pipe 2 with relation to the corrugated pipe 7 and the inner pipe 1. It will thus be clear that a desirable high degree of flexibility is provided, in addition to a sturdy construction providing for fluid tightness even under severe service conditions.

It will also be clear that while several lubricant and/or sealing injection locations are shown and described, all may not be necessary and can be distributed in accordance with the service conditions encountered.

In considering the operation of the secondary seal mechanism, let it be assumed that steam or other fluid is entering the inner pipe 1 from the line (not shown). The steam will flow initially over the outer surface of the corrugated pipe or bellows 7 before discharging into outlet 5 and further assuming that the weld seals at 8, 15, 17, and 19 are fluid tight, there will be no leakage into the inner chamber defined by the corrugated pipe around the inner pipe 1. The fluid flow will move directly on into the outlet 5 as above mentioned. However, let it be considered that one of these weld sealing connections, or perhaps the corrugated pipe itself, has actually cracked, ruptured or opened up even slightly, then the escaping line fluid will enter on the inner chamber defined by the corrugated pipe 7, passing over the inner pipe 1 and move on into the annular chambers defined at 14 and 33 to fill these combined chambers as well as that outer extension thereof established by the arcuate concave surface 32 of the shoe. There will be visual indication of such leakage occurring by the indicator on the pressure gauge G. Under these circumstances, it is clear that it becomes immediately necessary for the secondary seal as hereinabove described to come into its remedial function and operation. Fluid leakage will be prevented from moving over the outer periphery of the liner 21 by means of the packing suitably compressed within the stuffing box 41 and, similarly, the abutting contact of the spheroidal sealing surfaces 34 and 36 will prevent leakage therepast. It will thus be understood that if any fluid leakage is apparently taking place from either of these sources, additional sealant can be conveniently and effectively applied at the adapters 46 and 63 by the usual gun or other means. It will also be clear, because of the use of O-ring sealed pistons in addition to ball check valves as previously referred to, that when injecting the sealant through the walls of the yoke 38 and the shoe 31, the sealant flows into the annular chambers described and thus fills each of the said chambers beneath the pistons and the check valves at the base of each of the gun fittings 46 and 63. After pressure filling the said chambers to the desired amount of sealant, the pistons 72 are thus lifted or moved axially until they bear tightly against the spring 71 within piston retainer 68. Thus, it will be apparent that a fine and accurate control of the applied sealant pressure as well as the quantity of sealant being supplied is provided. Further, the sealant stuffing box of the yoke constitutes a dynamic seal in which the sealant is contained in a reservoir capable of being maintained under fluid sealant pressure and prevents the quick dissipation or loss of the sealing pressure, thereby adding to the effectiveness of the fluid seal.

It will also be clear that the sealant in the yoke stuffing box, as at chambers 65 and 67, has a significant lubrication value by virtue of its introduction between the surfaces 36 and 34. It thereby avoids objectionably high stresses from being transferred to the corrugated pipe or bellows member 7 which might otherwise occur when the pipeline upon which the secondary seal is applied must yield to such stresses to avoid serious damage to the line and its connections.

It will be understood that pressure switch activation by any suitable means connected to the gauge G will indicate visually whenever the corrugated pipe 7 has failed and that the secondary seal hereinabove described in detail is being used thereafter as the primary seal.

Referring now to a further modified construction as shown in FIG. 4, the secondary seal may also be formed by providing a pair of axially aligned stuffing boxes preferably employing conventional high temperature braided die-formed ring-type asbestos packing or any other packing suitable for the purpose. In this construction, it will be understood that the yoke 92 is positioned in the same manner as described in connection with FIGS. 1 to 3 inclusive, being welded as at 74 to the inner pipe 1. In the instant modified construction, the sealing shoe 93 is mounted over the threaded liner 21, the liner being fitted relatively snugly over the outer pipe 2 and having the threaded portion 22 for engagement by the threaded gland flange 23 to bear against the thrust ring 94, the latter member being slidably movable over the liner periphery to bear against a resilient Belleville type washer 95 and the gland 96, the latter member projecting within the stuffing box defined at 97, whereby to compress the packing 98 contained within said stuffing box. At its outer end portion, the liner 21 is weld-sealed at 99 to the outer pipe 2. It will also be noted that attached to the inner peripheral surface of the outer pipe 2 is the ring member 101, weld-secured to both the inner and outer rings or ferrules 102 and 103, as well as to the end portion of the corrugated pipe 7, as indicated at 104. The upper end portion of the yoke 92 is provided with the inturned flange portion 105 for receiving the interposed member 106, the latter being held to the yoke portion 105 by means of the bolts 107 annularly mounted on an inner annular portion of the flange, as shown. The interposed member 106 is attached to the inside pipe by means of the weld 108 and the flange portion 105 is formed with an annular recess 109 within which the coil springs 111 are received to bear against the packing washer 112, the packing being retained on its outer periphery by means of the relatively closely fitted liner 114. Thus, it will be understood that the packing 113 is under relatively constant compression against the hardened surface 115 of the shoe member 93. In this case, it will be clear that the construction is one in which instead of using a fluid sealant a yoke stuffing box is formed by the portion of the yoke welded by the pipe, the outside diameter of the stuffing box being defined by a loose ring 114, which retains the packing and facilitates assembly of the outer yoke 92 being placed in desired position. The metal washer 112 is assembled on top of the packing, and, of course, a number of coil springs may optionally be assembled at 109 in the yoke. The packing is thus kept under load and in constant contact with the outer pipe stuffing box flange to form a fluid tight seal, even as the sealing packing becomes worn in service. Disassembly of the outer stuffing box at 97 will not be required often because in this construction a static seal is formed, while extra rings of packing are provided in the yoke stuffing box at 113, and it thereby forms a dynamic seal. It will be appreciated that the friction normally resistant to the packing seal surface should be kept relatively low in order to prevent excessive strain on the corrugated pipe.

At its opposite end portion, the trunnion attachment to the yoke 92 is made by means of the trunnion 116 flanged as at 117 to bear against the bushing 118 and being held in place against endwise movement by means of the sleeve 119, the latter member being weld-secured as at 121 and holding the trunnion 116 against rotation relative to the sleeve 118 by means of a lock screw 122. In the same manner as described generally in connection with FIGS. 1 to 3 inclusive are the side mounted oppositedly disposed trunnions (not shown) on the horizontal axis engaging the outer pipe 2 in the same manner as shown at the weld-secured bearing 77 in FIG. 3. A second pair of trunnions are used to hold the assembly against relative longitudinal movement between the yoke 92 and the outer pipe 2. In operation, the construction follows very much the pattern described in connection with the previous figures. Therefore, if failure of the corrugated pipe should occur or the weld seal at 104 should fail for any reason, it will be understood that the entry of fluid into the chamber 100 of the shoe from the space outside of the corrugated pipe 7 will take place, and the packing must necessarily form the seal. Actually, the fluid so escaping from the chamber 100 will apply pressure on the shoe flange beyond the opening 33 so that as to the bearing surfaces 115 and 120 a substantially pressure actuated seal will be provided.

Also as in the manner described in connection with the previous figures, a pressure gauge G having communication with the chamber 100 will record the fact that the bellows or corrugated pipe has failed and the supplemental seal is necessarily called into action.

Referring now to FIG. 5, a further modification of the supplemental sealing means is shown in which the secondary seal includes a labyrinth arrangement of interlaced dished discs. In this construction, it will become apparent that after the escaping steam is forced through a small clearance existing between the discs, the escaping steam will expand to a larger area, thereby to cause the fluid pressure to reduce and the steam to condense. It will also be apparent that after the steam flows through a plurality of labyrinth discs as hereinafter described, the fluid pressure will drop considerably, the quantity of fluid escaping to the atmosphere being relatively slight. In this construction, it will be apparent a spring loaded stuffing box will prevent leakage of steam between the outer wall connected to the labyrinth discs and the outer shell pipe connected to the unit. Further, a spring load on the stuffing box maintains a thrust on the stuffing box housing, which keeps the latter member in contact with the yoke and differential steam pressure across the labyrinth discs will add to the thrust of the stuffing box against the yoke.

In general, the construction follows the arrangement shown in FIG. 4, insofar as the attachment of the corrugated pipe 7 to the inner pipe 1 is concerned. Also, the attachment of the inner and outer rings to the opposite ends 101, 102, and 103 follows the pattern described in connection with FIG. 4, as well as the weld attachment at 104. Considering the labyrinthal arrangement of the discs 123 and 124 together with the interposed or spacer discs 125 and 126, these members are assembled in abutting relation to each other to bear against the inner curved surface 127 of the cup-shaped member 128. They are held in spaced-apart relation at their outer peripheral portions by means of the washers 129 and 131 mounted as indicated by means of the spacer washer 132 on the inner end portion thereof placed immediately adjacent the outside periphery of inner pipe 1. Further, for the purpose of aid in holding the labyrinthal disc 125 in position, the stuffing box 133, the packing 134, and the threaded packing gland 135 are provided. The yoke 136 bears against the outer surface 137 of the cup-shaped member 128 and the stuffing box arrangement as described in connection with FIG. 4 at 114, with the packing 113 being applied in the same manner as described in connection with the previous figure. Likewise, the attachment of the insert member 106 to the inner pipe 1 is accomplished through the annular weld 108 and also is applied in a similar manner. Said packing is held to insert 106 and encloses the latter member in the same way as previously described.

At its inner end portion, the modified shoe member 128 is slightly recessed as at 138, whereby to cooperate with the liner 21 in providing a stuffing box for receiving the packing 139. Over the said packing, the gland 141 is mounted to surround a portion of the liner 21 and threadedly receives the gland 23 in the same manner as described in connection with FIG. 4 for applying the desired compression load to the packing. At its opposite end portion, the yoke 136 is provided with the oppositely disposed trunnions 116 and which members are attached in a manner similar to that described in connection with FIG. 4. Similarly, the side disposed trunnions (not shown) are applied in the manner shown and described in connection with FIG. 3, the side disposed trunnions 75 being attached to the outer pipe 2 by the bearings 77. In this modified form, a pressure sealing type of chevron packing is preferably arranged between the outer periphery of the inner pipe 1 and the labyrinth formed by discs and spacer discs 123, 124, 125, and 126. Both inner and outer stuffing boxes are free to move in response to bending stresses encountered and to compensate accordingly for wear occurring at the gimbal joints designated at 116 or at 75. Since the labyrinths are sealed against fluid leakage occurring at the inner and outer pipe, it will be apparent that the flow of the escaping steam or other fluid is necessarily delayed or extended, because in order to escape to atmosphere, the steam must flow through the labyrinth, thereby actually creating a pressure sealing condition between the disc members constituting the labyrinth.

FIG. 6 is a modified form of the construction shown in FIG. 5 in that in both types of supplemental sealing means a labyrinth arrangement of interlaced dished discs are employed for effecting the fluid seal between the yoke and the sealing shoe. However, in the instant construction, it will be noted that the bellows or corrugated pipe 7 is enclosed within a sleeve member 142, the latter member having an inturned flange portion 143 in fluid tight relation as at 144 by an annular weld or the like connection with an end limit of the corrugated pipe 7. A spacer ring 103 is applied to the assembly in the same manner as described in connection with FIG. 5. The labyrinthal discs 124 and 125 are also applied in a manner similar to that described in connection with FIG. 4. In this construction, it will also be appreciated that the functioning of the labyrinth discs is identical to that described in connection with FIG. 5. The thickened sleeve 142 receives the threaded liner 21 and the latter is weld attached as at 145 to the said thickened member. The yoke 136 is provided with the annularly extending packing rings 113 and the springs 109 in the annular recess 111. The said springs are held in place by means of the threaded bolts 146. In all other respects, the construction is similar to that described in connection with FIG. 5. In the instant modification, the construction eliminates the use of the liner 129 for retaining the labyrinthal discs in position. The usual gauge for indicating the pressure condition within the fluid receiving chamber 100 is connected by means of tube 146 and extends through the walls of the yoke 136 by means of the passage 147 connecting with the pressure gauge as shown.

The modification shown in FIG. 7 follows the general arrangement shown and described in connection with FIG. 6, except that as a substitute for the chevron packing around the inner pipe 1 a weld connected liner member as at 148 is applied to the inner pipe 1 and is within the yoke flange portion 149. Also in this construction, it will be noted that the packing box arrangement previously described in connection with the liner 21 is replaced by an annular weld seal or other suitable sealing means, the said seal being applied at 151 directly to the cup-shaped shoe member 128. An interposed liner 150 is also weld attached at 151 and receives the end portion of the member 142 as shown. This modified construction is particularly useful in such instances where an economical construction is desirable and in which there is less likelihood of lateral movement.

In FIG. 8, a further modification is shown of the constructions shown in FIGS. 6 and 7. In this modified form, an assembly of secondary disc labyrinths is arranged concentrically in nested relation between the primary elements respectively consisting of the shoe 128 and the yoke 136. In this construction, therefore, it will be noted that the secondary seal includes a plurality of elements forming labyrinth seals with a series of secondary labyrinths arranged concentrically therebetween on the primary elements as shown and described. It will be understood that the secondary labyrinths function in a manner quite similar to that of a leaf-spring and this structural arrangement therefore provides a suitable light loading applied axially against the primary labyrinth. It thus tends also to increase the pressure drop across each of the said secondary labyrinth elements.

In this modified form, it will further be noted that the secondary elements are also employed as a fluid seal applied at the base of the primary elements, whereby to reduce steam leakage if and when it occurs at these locations upon failure or defection of the corrugated pipe or bellows. It will also be apparent from a more detailed inspection of this structure that both sets of the primary elements are free to slide on the inner and outer pipes; thus, the pressure differential across the labyrinths tends to load the secondary elements welded to the yoke. It will further be appreciated that free sliding movement of the primary set of elements permits self-adjustment of the primary elements when wear occurs in the gimbal joints as at 116 and 75 as hereinabove previously referred to.

Proceeding with the description of the detail construction of this modification in FIG. 8, it will be noted that the inner pipe 1 is welded to the yoke 136 as at 108 in the same way as described previously in connection with FIGS. 6 and 7. However, in the instant modified form, the inner relatively short liner 152 is weld-attached annularly as at 148 to the inner pipe 1, and further is formed to receive the lesser diameter dish-shaped member 153, the latter carrying on both of its sides, the dish-shaped nested labyrinthal discs 154 and 155 so as to fit within the chamber defined at 156 by the inward projecting flange portion 157 of the shoe 128 and the enlarged dish-formed member 158. In all other respects, the construction follows the details set forth and described in connection with FIG. 7, but in this construction it will be appreciated that as line pressure enters the chamber 100, it will cause the labyrinthal discs 154 and 155 on either side of the separator member 153 to be compressed and thereby forced radially outward. Such change in form will increase the breadth or scope of the contact made by the discs 154 and 155 with the shoe 128 at its flange portion 157 and also having a similar effect upon the labyrinth discs 159 interposed between the said flange portion 157 and the inner surface 161 of the yoke 136.

A further modified form of secondary seal is shown and described in connection with FIG. 9. In this embodiment, the packing 162 is interposed between the outside of the cylindrical or annular member 163 welded at 164 at its outer periphery to the inner surface 161 of the yoke. A second gland-like member 165 is arranged within the interior of the pipe 166 to slidably engage the outer surface of the member 163 and bear against the packing 162 to hold the latter under suitable compression. In this structure, a plurality of annularly disposed coil springs 168 are interposed so as to shoulder between an upper recessed surface 169 and the underside of the fixed annular flange 171, the latter member being mounted on the corrugated pipe end in the manner previously described in connection with the other figures. It will thus be clear that in this construction the spring loading of the gland 165 and the differential pressure applied across the end of packing exerts an axially applied force which beneficially maintains the packing in contact with the bottom of the stuffing box adjoining the annular weld 164 to bear against the yoke inner surface 161. Thus the packing will be constantly forced to the bottom of the stuffing box as the packing portion in contact with the limitedly movable surface 161 is worn away in service. It will also be noted in this construction that the member 163 is formed at one end portion thereof with a spheroidal surface 172 to make a fluid sealing contact with the similar surface 161 of the yoke 136. Similarly, the pipe 166 is formed with a convex surface as at 173 to make a similar contact outside of the stuffing box whereby to aid in holding the packing 162 in place. In this modified form of construction, the pressure gauge G is in communication with the annular chamber 33 to record fluid leakage occurring within the chamber limits 100 by means of the connecting passage 174 and the L-formed tubing 175 connecting with the gauge G.

In the further modification shown in FIGS. 10 and 11, the secondary seal change lies in the cooperation effected between the outer pipe 2 receiving at an inner end portion thereof an angular form of annular member 177 having an inturned flange 178. The latter portion is provided with a reduced extension annular portion 179, the end limit of which at ring 181 is provided with a preferably hardened surface to make contact with a hardened facing 180 preferably applied over the surface 161 of the yoke 136. In the instant modified construction, the chamber 100 is maintained in pressure sealed relation to the outer portion of the corrugated pipe 7 by means of an interposed ring 182 weld-attached on inner and outer peripheral portions at 183 and 184 to the pipe member 2 and also at 170. Further attachment follows with the inner ring member 185 and the spacer ring or ferrule 103 applied in a manner similarly illustrated and described previously. In this construction, it will be appreciated that similarly in response to the line stresses applied to the respective gimbal trunnions 116 and 75 (FIG. 11) and to any transverse or pivotal movement resulting the hardened annular member 181 will function to provide the fluid sealing contact with the hardened surface 180. Due to the nature of the formation being inclined as to the latter surface, the higher the pressure the higher the load applied at the contact of the member 181 with the surface 180.

In the exterior view of FIG. 11, the general arrangement of the respective trunnions at 116 and 75 in relation to the overall assembly are more clearly illustrated, and one preferred form of the arms of the yoke 136 is indicated at 186.

FIG. 12 illustrates still another modification in which an angular shoe member 187 has an inturned flange portion 188, the outer inclined convex surface of which is preferably hardened as at 189 to bear in fluid sealing relation against the hardened surface 191 of the spring loaded seat ring 192 mounted in the yoke 136. In this construction, the seat ring 192 is held in axial thrust position against the surface 189 by means of the annularly spaced apart coil springs 193 received within the recess as shown.

In other respects, the construction follows the details set forth in describing FIG. 10. It will be noted that in order to retain the seat ring 192 properly against undue outward flaring under high seating loads encountered, a reinforcing and outwardly supporting plate-like member 194 is weld-attached to the interior of the yoke 136 as at 195. Here, similarly, in the manner of operation previously described, it will be apparent that the construction provides conveniently for handling leakage of fluid occurring within the chamber 100. It will also be clear that fluid pressure exerted against the inner face of the flange 188 will cause the latter member to be directed outwardly against the seating surface 191 of the seat ring 192. The latter member being reinforced in its resistance to objectionable flaring or distortion by means of the interposed ring support member 194 will aid in stabilizing the positioning of the said seat ring.

A plurality of embodiments have been shown and described, but it will be appreciated that this has been done only for purpose of illustration of the wide scope of the invention and not for purposes of limitation.

We claim:

1. In a fluid pressure retaining resilient body comprising a substantially cylindrical casing, an inner pipe member received within said cylindrical casing, a corrugated pipe mounted over the inner pipe member and extending in an annularly spaced relation between the said casing and the inner pipe member, the corrugated pipe having at its end limits respective fluid sealed connecting means with said inner pipe member at one end and with said cylindrical casing at the other end, a second casing including a yoke member extending over at least a portion of said first named casing, the yoke member being mounted in fluid sealing relation to the said inner pipe member, a fluid sealing shoe member cooperating with said first named casing at an end portion thereof and having fluid sealing contact with the said yoke member, fluid sealing means disposed between said shoe member and first named casing, and trunnion means cooperating with said yoke member and said cylindrical casing.

2. In a fluid pressure holding flexible element comprising an outer casing with a substantially axially extending opening, inner pipe means received within said latter opening in telescoped relation, one of said pipe means being corrugated and having respective fluid sealing connections with one of the telescoped pipe means at one end portion thereof and with the said casing adjacent the transverse opening, cup-like means with a central port therethrough and being mounted over the latter mentioned fluid sealing connection, fluid sealing means between the cup-like means and the said casing, a yoke member having gimbal connection means with said casing on an outer peripheral portion of the latter member, means mounting the yoke member to the inner pipe means, means for sealing between said yoke member and the inner pipe means, means between surfaces of an imperforate portion of the said cup-like means and the said yoke member for effecting fluid sealing between said surfaces.

3. In a fluid pressure holding flexible element comprising an outer casing with a substantially transverse opening therethrough, inner pipe means received within said later opening in telescoped relation, one of said pipe means being resilient and having respective fluid sealing connections with an annular end portion of the telescoped pipe means and with the said casing adjacent the transverse opening, cup-like means with a central port therethrough mounted over the later mentioned fluid sealing connection, gasket means between the cup-like means around the port and the said casing, a yoke member having universal connections with said casing on opposite peripheral portions of the latter member, means connecting the said yoke member to said inner pipe means, means for sealing between said yoke member and the inner pipe means, fluid sealing means interposed between surfaces of an inturned portion of the said cup-like means and the said yoke member.

4. In a secondary pressure holding flexible element, the combination comprising an outer casing with a substantially axial opening therethrough, inner pipe means received within said latter opening in telescoped relation, the outer one of said pipe means being corrugated and having respective fluid sealing connections with the other of the telescoped pipe means at one end portion thereof and with the said casing adjacent the transverse opening, cup-like means with convex and concave surfaces within and with a central port therethrough, the said cup-like means being mounted over the latter mentioned fluid sealing connection, fluid sealing means between the said convex and concave surfaces of said cup-like means and the said casing, a yoke member ported to receive said inner pipe means and having outer gimbal means cooperating with said casing on a peripheral portion of the latter member, means connecting the said yoke member to said inner pipe means, means for sealing between said yoke member and the inner pipe means, means between inner oppositely disposed surfaces of portions of the said cup-like means and the said yoke member beyond their ported portions for effecting fluid sealing between said surface portions.

5. In a fluid pressure retaining resilient body comprising a substantially cylindrical casing, an inner pipe member received within said casing, a resiliently formed pipe mounted over the inner pipe member and extending in annularly spaced relation between the said casing and the inner pipe member, the resilient pipe having at its end limits respective fluid sealed connections with said inner pipe member at one end thereof and with said cylindrical casing at the other end, a second casing including a yoke member extending over at least a portion of said first named casing, the yoke member being mounted in fluid sealing relation to the said inner pipe member, a fluid sealing shoe member fitted over said first named casing at an end portion thereof and having fluid sealing outer surface contact with an inner surface of the said yoke member, common fluid sealing means disposed within said shoe member and said first named casing, and trunnion means on an end portion of the said yoke member to cooperate with said cylindrical casing pivotally at a plurality of annularly disposed locations.

6. In a fluid pressure retaining resilient body, the combination comprising a substantially cylindrical casing, an inner pipe member received within said cylindrical casing, a corrugated pipe mounted over the inner pipe member and extending in an annularly spaced relation between the said casing and the inner pipe member, the corrugated pipe having at its end limits respective fluid sealed connecting means with said inner pipe member at one end and with said cylindrical casing at the other end, a second casing including a yoke member extending over at least a portion of said first named casing, the yoke member being mounted in fluid sealing relation to the said inner pipe member, a fluid sealing shoe member with an annular inturned portion cooperating with said first named casing, the said shoe member having fluid sealing contact with said yoke member, fluid sealing means disposed between said shoe member and said first named casing, and trunnion means pivotally movable in opposite planes on outer portions of said yoke member and said cylindrical casing.

7. In a fluid pressure retaining resilient body comprising a substantially cylindrical casing, an inner pipe member received within said cylindrical casing, corrugated pipe means connected to the inner pipe member and extending in an annularly spaced relation over a substantial length of the inner pipe member betweent the said casing and the inner pipe means, the corrugated pipe means having one end limit being provided with fluid sealed connecting means cooperating with an end of the said cylindrical casing, a yoke member extending over at least a portion of said casing and mounted in fluid sealing relation to the said inner pipe member, a fluid sealing shoe member enclosing end portions of the casing and corrugated pipe and having fluid sealing contact on an outer substantially transverse surface with said yoke member, sealing means between said shoe member and casing, a sealing connection between said corrugated pipe means and both the inner pipe member and said casing, and pivotal means annularly disposed cooperating with said yoke member and with said cylindrical casing to permit predetermined pivotal movement therebetween in a plurality of planes.

8. In secondary fluid pressure retaining resilient means, the combination comprising a substantially cylindrical housing, an inner pipe member telescoped within said cylindrical housing, a corrugated pipe mounted over the inner pipe having fluid sealing connections at both limits thereof respectively with the housing and inner pipe member, a second housing including a recessed yoke member extending over at least a portion of said first named housing, the said yoke member being movably mounted in fluid sealing relation to the said inner pipe member, a fluid sealing shoe member within the recessed portion of the yoke member cooperating with said first named housing and having a fluid sealing end contact with the recessed portion of the said yoke member, sealing means between said shoe member and said cylindrical housing, and trunnion means pivotally movable on said yoke member and cylindrical housing.

9. Secondary fluid pressure retaining resilient means comprising a substantially cylindrical expanded casing, an inner pipe member received within said cylindrical casing substantially forming a continuation of a reduced portion of said casing, flexible pipe means mounted over the inner pipe member in annularly spaced relation to the expanded portion of the said casing and the inner pipe member, said flexible pipe means having its end limits defined by connections respectively with said inner pipe member and with said casing at the expanded portion thereof, a yoke member overlying and extending over at least an expanded portion of said first named casing, the said yoke member having packing means arranged in fluid sealing relation to the said inner pipe member, a fluid sealing shoe member respectively cooperating with said first named casing at an end portion thereof and with said packing means of the yoke member, sealing means between said shoe member and said casing, a sealing connection between said flexible pipe means and both the inner pipe member and the casing, and trunnion means in a plurality of planes respectively connected to said yoke member and said expanded casing.

10. In secondary fluid pressure holding flexible means comprising an outer casing with a substantially axial opening therethrough, a plurality of inner pipe means received for a substantial axial portion of said casing opening, one of said inner pipe means being flexibly formed and having respective fluid sealing connections with the other of the said inner pipe means at one end portion thereof and at the opposite end thereof with the said casing, a cup-like ported shoe slidably mounted over the latter mentioned fluid sealing connection, removable fluid sealing means between the cup-like means and the said casing, a yoke having a plurality of gimbal connections cooperating with said casing on an outer peripheral portion of the latter member, means between surfaces of an imperforate portion of the said cup-like means and the said yoke member for effecting fluid sealing between said surfaces, means mounting the said yoke member to one of said inner pipe means, means for sealing between said yoke member and said inner pipe means, the said gimbal connections being of substantially annular configuration and allowing for the said outer casing to extend transversely therethrough.

11. In a fluid pressure holding flexible means, the combination comprising an outer substantially cylindrical casing with a substantially axial opening therethrough, inner pipe means received within said latter opening in telescoped relation, one of said latter pipe means being flexibly formed and having respective fluid sealing connections with one of the telescoped pipe means at one end portion thereof and with the said casing at an opposite end portion thereof, ported cup-like shoe means overlying at least one of the latter mentioned fluid sealing connections, fluid sealing means between the cup-like shoe means and the said casing, a yoke member having universal pivotal means with said casing, means mounting said yoke member to said inner pipe means, means for sealing between said yoke member and said inner pipe means, and means between surfaces of an imperforate portion of the said cup-like shoe means and the said yoke member for predeterminately applying a fluid sealing media between said surfaces.

12. In a fluid pressure holding flexible element of the character described comprising an outer casing with a substantially enlarged axial opening, inner pipe means received within said latter opening in telescoped relation thereto, one of said pipe means being corrugated and having respective fluid sealing end connections with one of the telescoped pipe means and with the said casing adjacent the enlarged transverse opening, shoe means with a central port therethrough mounted over the latter mentioned fluid sealing connection, a yoke member having a plurality of pivotal connections with said casing, means mounting said yoke member to said inner pipe means, means for sealing between said yoke member and said inner pipe means, renewable means between a flanged imperforate portion of the said shoe means and the said yoke member for effecting fluid sealing between said latter mentioned elements.

13. In a fluid pressure holding flexible element comprising an outer casing with cooperating means comprising a substantially axial enlarged opening, inner pipe means received within said latter opening in telescoped relation, one of said pipe means being flexible and having respective fluid sealing connections with one of the telescoped pipe means at one annular portion thereof and with an annular portion of the said casing adjacent the transverse enlarged opening, shoe means with a central port therethrough, the said shoe means having an inturned flange overlying the latter mentioned fluid sealing connection and having packing means to cooperate with the latter connection, adjustable fluid sealing means between the shoe means and the said casing, a yoke member having a gimbal connection with said casing on an outer peripheral portion of the latter member, means mounting said yoke member to said inner pipe means, means for sealing between said yoke member and said inner pipe means, means between opposed surfaces of the inturned flange of the said shoe means and the said yoke member for effecting fluid sealing under pressure between said opposed surfaces.

14. In a combined primary and secondary fluid pressure holding flexible element, the combination of an outer casing and a plurality of inner pipe means received within said casing in telescoped relation, one of said pipe means being of flexible construction and having respective fluid sealing connections with the outer one of the telescoped pipe means at an end portion and with the said casing adjacent the other end thereof, cup-like means with a central port therethrough and being mounted over at least one of the latter mentioned fluid sealing connections, fluid sealing means between the cup-like means and an end portion of the said casing, a yoke member having a plurality of gimbal connections at least a pair of which connections engage said casing on an outer peripheral surface thereof, means connecting the said yoke member to said inner pipe means, means for sealing between said yoke member and the inner pipe means, selective means between surfaces of an imperforate portion of the said cup-like means and the said yoke member for renewing fluid sealing between said latter elements, the said selective means being accessible for actuation through the said yoke member.

15. In a fluid pressure holding flexible element comprising an outer casing with a substantially axial opening therethrough, inner pipe means received within said latter opening in telescoped relation, one of said pipe means being flexible and having respective fluid sealing connections with one of the telescoped pipe means at one end portion thereof and with the casing adjacent the transverse opening, cup-like means with a central port therethrough and being mounted over the latter mentioned fluid sealing connection, annular fluid sealing means between opposite inner surface portions of the cup-like means and the said casing, a yoke member having outer pivotal connections with said casing, a plurality of fluid sealing means respectively between the said cup-like means, the said yoke member and the casing, means connecting the said yoke member to said inner pipe means, means for sealing between said yoke member and said inner pipe means.

16. In combined primary and secondary fluid pressure holding flexible elements, the combination comprising an outer casing with a substantially axial opening therethrough, inner pipe means axially extendible within said casing in telescoped relation thereto, one of said pipe means being flexible and having respective fluid sealing connections with one of the telescoped pipe means at one end thereof and with the said casing at the opposite end thereof, shoe means with a central port therethrough adjacent the latter mentioned fluid sealing connection, supplemental fluid sealing means between the shoe means and the said casing, a yoke member having a pivotally mounted means cooperating with said casing, annularly extending means between an inturned flange portion of the said shoe means and the said yoke member for effecting fluid sealing between said latter elements, means connecting the said yoke member to said inner pipe means, means for sealing between said yoke member and the inner pipe means, the said shoe means cooperating with said outer casing to provide a portion of said supplemental fluid sealing means.

17. In a fluid pressure retaining resilient body comprising a substantially cylindrical casing, an inner pipe member received within said cylindrical casing, a corrugated pipe mounted over the inner pipe member and extending in annularly spaced relation between the said casing and the inner pipe member, the corrugated pipe having at its end limits respective fluid sealed connecting means with said inner pipe member at one end and with said cylindrical casing at the other end, a second casing including a yoke member extending over at least a portion of said first named casing, the yoke member being mounted in fluid sealing relation to the said inner pipe member, a fluid sealing shoe member cooperating with said first named casing and having fluid sealing contact with said yoke member, labyrinth fluid sealing means disposed within said shoe member and said first named casing, and trunnion means on said yoke member and connected with said first named casing to permit limited pivotal movement therebetween.

18. In a fluid pressure retaining resilient body comprising a substantially cylindrical casing, an inner pipe member telescoped within said cylindrical casing, a corrugated pipe telescoped over the inner pipe member and extending in annularly spaced relation between the said casing and the inner pipe member, the corrugated pipe having at its end limits respective fluid sealed connecting means with said inner pipe member at one end and with said cylindrical casing at the other end, a yoke member extending over at least a portion of said casing, the yoke member mounted in fluid sealing relation to the said inner pipe member, a fluid sealing shoe member cooperating with said first named casing at an end portion thereof and having fluid sealing contact with said yoke member, fluid sealing means disposed respectively within said shoe member and around an end portion of said cylindrical casing, and trunnion means pivotally connecting said yoke member with said cylindrical casing.

19. In a fluid pressure retaining resilient body comprising a substantially cylindrical casing, an inner pipe member received within said cylindrical casing, a corrugated pipe mounted over the inner pipe member and extending in annularly spaced relation between the said casing and the inner pipe member, the corrugated pipe having at its end limits respective fluid sealed connecting means with said inner pipe member at one end and with said cylindrical casing at the other end, a yoke member extending over at least a portion of said first named casing, the yoke member being mounted in fluid sealing relation to the said inner pipe member, a fluid sealing shoe member connected to said casing and having fluid sealing contact with said yoke member, a plurality of fluid sealing means removably disposed between said shoe member and said casing, and gimbal means annularly disposed between said yoke member and said cylindrical casing.

20. In a fluid pressure retaining resilient body comprising a casing, an inner pipe member received within said casing, a corrugated pipe mounted over the inner pipe member and extending in spaced relation between the said casing and the inner pipe member, the corrugated pipe having at one end portion a fluid sealed connection with said inner pipe member and with said casing at the other end portion, a second casing including a yoke member extending over at least a portion of said first named casing, the yoke member being mounted in fluid sealing relation to the said inner pipe member, a fluid sealing shoe member carried by said casing and having fluid sealing contact means supported between said yoke and shoe members, means connecting said shoe member and said first named casing, a sealing connection between said corrugated pipe and both the inner pipe member and casing, and annularly spaced apart trunnion means extending between said yoke member and said first named casing to permit of limited flexibility between the said inner pipe and said yoke member.

References Cited in the file of this patent

UNITED STATES PATENTS

| | | |
|---|---|---|
| 390,240 | Legat | Oct. 2, 1888 |
| 1,213,906 | Ray | Jan. 30, 1917 |
| 2,713,503 | Ekholm | July 19, 1955 |